United States Patent
Voors et al.

(10) Patent No.: US 10,693,549 B1
(45) Date of Patent: Jun. 23, 2020

(54) MULTI-FREQUENCY HIGH FREQUENCY DATA LINK

(71) Applicant: Rockwell Collins, Inc., Cedar Rapids, IA (US)

(72) Inventors: Gregory R Voors, Melbourne, FL (US); Neil J. Earnhardt, Jr., Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/118,082

(22) Filed: Aug. 30, 2018

(51) Int. Cl.
*H04B 7/06* (2006.01)
*H04B 7/185* (2006.01)
*H04L 5/00* (2006.01)
*H04W 72/04* (2009.01)
*H04L 5/06* (2006.01)
*H04W 4/40* (2018.01)

(52) U.S. Cl.
CPC ......... *H04B 7/068* (2013.01); *H04B 7/18502* (2013.01); *H04L 5/0098* (2013.01); *H04L 5/06* (2013.01); *H04W 72/0406* (2013.01); *H04W 72/0453* (2013.01); *H04W 4/40* (2018.02)

(58) Field of Classification Search
CPC ............... H04B 7/068; H04B 7/18502; H04W 72/0406; H04W 72/0453; H04W 4/40; H04L 5/06; H04L 5/0098
See application file for complete search history.

(56) References Cited

U.S. PATENT DOCUMENTS

| | | | | |
|---|---|---|---|---|
| 7,085,306 | B1* | 8/2006 | Voldman | H04B 1/715 348/E7.063 |
| 7,148,816 | B1* | 12/2006 | Carrico | G01C 23/00 340/961 |
| 9,596,685 | B1* | 3/2017 | Studenberg, Jr. | H04W 72/0453 |
| 2009/0129323 | A1* | 5/2009 | Chen | H04W 40/246 370/329 |
| 2010/0197317 | A1* | 8/2010 | Sadek | H04W 72/082 455/452.2 |
| 2012/0021740 | A1* | 1/2012 | Vaidyanathan | H04B 7/18506 455/431 |
| 2012/0113823 | A1* | 5/2012 | Zeng | G08G 5/0013 370/252 |
| 2013/0009823 | A1* | 1/2013 | Wang | G01S 13/765 342/464 |
| 2013/0089039 | A1* | 4/2013 | Vashi | H04W 72/02 370/329 |
| 2013/0329692 | A1* | 12/2013 | Vrzic | H04W 72/0453 370/329 |
| 2014/0197981 | A1* | 7/2014 | Hartley | G01S 13/74 342/37 |
| 2015/0263781 | A1* | 9/2015 | Pelleschi | H04B 1/54 455/527 |
| 2016/0119912 | A1* | 4/2016 | Terry | H04L 1/0023 370/329 |

(Continued)

*Primary Examiner* — Will W Lin
(74) *Attorney, Agent, or Firm* — Donna P. Suchy

(57) ABSTRACT

Various embodiments are directed to systems, methods, and devices for concurrent high frequency down link air to ground communication transactions using multiple frequencies. A ground station radio device includes a transmitter to transmit uplink data to a plurality of aircraft over a first frequency, and a receiver to receive downlink data from the plurality of aircraft over a plurality of second frequencies that are different from the first frequency.

20 Claims, 6 Drawing Sheets

(56) References Cited

U.S. PATENT DOCUMENTS

| | | | | |
|---|---|---|---|---|
| 2017/0257807 A1* | 9/2017 | Zacharias | ............ | H04W 36/14 |
| 2017/0280382 A1* | 9/2017 | Radulescu | ............ | H04W 48/10 |
| 2017/0371040 A1* | 12/2017 | Whitefield | ............. | G01S 19/21 |
| 2018/0092128 A1* | 3/2018 | Um | ................... | H04W 74/0808 |
| 2018/0376456 A1* | 12/2018 | Tsutsui | ................. | H04L 5/0032 |
| 2019/0280772 A1* | 9/2019 | Boroson | ................ | H04B 10/29 |
| 2019/0289532 A1* | 9/2019 | Yi | ........................ | H04W 76/11 |

\* cited by examiner

MULTI-FREQUENCY HIGH FREQUENCY DATA LINK

BACKGROUND

Typically, a High Frequency Data Link (HFDL) protocol for airborne high frequency (HF) communications uses a single frequency for a plurality of aircraft to communicate with a ground station, and the ground station uses the same single frequency to communicate with the plurality of aircraft. The HFDL protocol is a time division multiple access (TDMA) protocol having a frame rate of 32 seconds for a single, one way communication transaction (e.g., aircraft transmits and ground station receives or ground station transmits and aircraft receives). A subsequent frame (e.g., a next frame 32 seconds later or a frame beyond the next frame 64 seconds later) includes a response or acknowledgment that indicates whether the communication transaction was successively received by the ground station. If the communication transaction was not successively received by the ground station, the aircraft waits and continuously tries again (e.g., up to another 64 seconds) and again (e.g., up to another 64 seconds), until the aircraft receives the acknowledgement from the ground station.

Since a plurality of aircraft can concurrently (or simultaneously) vie for 3-6 downlink slots available for each 32 second frame on the same single frequency, and the ground station transmits acknowledgements during the same 32 second frames on the same single frequency, there may be many transmission collisions resulting in many transmission fails and retries. The delay caused by transmission fails and retries is becoming increasingly unacceptable, and may not support new communication requirements from customers and certification bodies. Thus, an efficient and effective way to support multiple concurrent HF communication transactions may be desired.

SUMMARY

In one aspect, the inventive concepts disclosed herein are directed to a ground station radio device. The ground station radio device includes a transmitter and a receiver. The transmitter is configured to transmit uplink data to a plurality of aircraft over a first frequency. The receiver is configured to receive downlink data from the plurality of aircraft over a plurality of second frequencies that are different from the first frequency.

In some embodiments, the transmitter may be configured to repeatedly broadcast housekeeping data over the first frequency including a list of the plurality of second frequencies.

In some embodiments, the receiver may be configured to receive downlink data from a first aircraft from among the plurality of aircraft over one of the second frequencies, and to receive downlink data from a second aircraft from among the plurality of aircraft over a different one of the second frequencies.

In some embodiments, the receiver may be configured to receive the downlink data from the first and second aircraft over the different second frequencies concurrently.

In some embodiments, the transmitter may be configured to transmit acknowledgment messages to the plurality of aircraft over the first frequency in response to receiving the downlink data over the plurality of second frequencies.

In some embodiments, the receiver may be configured to monitor each of the plurality of second frequencies concurrently.

In another aspect, the inventive concepts disclosed herein are directed to an aircraft radio device. The aircraft radio device includes a receiver and a transmitter. The receiver is configured to receive uplink data from a ground station over a first frequency. The transmitter is configured to transmit downlink data to the ground station over one of a plurality of second frequencies that are different from the first frequency.

In some embodiments, the receiver may be configured to receive housekeeping data from the ground station over the first frequency to identify the plurality of second frequencies.

In some embodiments, the receiver may be configured to monitor each of the plurality of second frequencies concurrently to identify an available frequency from among the plurality of second frequencies on which to transmit the downlink data.

In some embodiments, the available frequency may be identified as one in which another aircraft is not currently transmitting downlink data on.

In some embodiments, the radio device may further include a frequency selector configured to identify the first frequency from a frequency table including a list of broadcast frequencies of all ground stations.

In some embodiments, the receiver may be configured to receive an acknowledgment message from the ground station over the first frequency in response to successfully transmitting the downlink data over the one of the plurality of second frequencies.

In yet another aspect, the inventive concepts disclosed herein are directed to a method for air to ground communications. The method includes transmitting, by a first radio device of a ground station, housekeeping data to a plurality of aircraft over a first frequency, and receiving, by the first radio device, downlink data from each of the plurality of aircraft over a plurality of second frequencies that are different from the first frequency.

In some embodiments, the downlink data may be received from each of the plurality of aircraft over different ones of the second frequencies.

In some embodiments, the housekeeping data may include information corresponding to a list of the plurality of second frequencies that the ground station is monitoring.

In some embodiments, the method may further include choosing, by a second radio device of a first aircraft from among the plurality of aircraft, a first available frequency from among the second frequencies, and transmitting, by the second radio device, downlink data to the ground station over the first available frequency.

In some embodiments, the method may further include choosing, by a third radio device of a second aircraft from among the plurality of aircraft, a second available frequency from among the second frequencies, and transmitting, by the third radio device, downlink data to the ground station over the second available frequency. In some embodiments, the second available frequency may be different from the first available frequency.

In some embodiments, the downlink data may be received concurrently from each of the first and second aircraft over respective ones of the first and second available frequencies.

In some embodiments, the first radio device may be configured to broadcast an acknowledgment message over the first frequency in response to successfully receiving the downlink data over the plurality of second frequencies.

In some embodiments, the housekeeping data may be interleaved with uplink data packets.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Various embodiments of the present disclosure are directed to a communication system for supporting multiple air to ground HF communication transactions concurrently (e.g., simultaneously or at the same time). According to various embodiments, a ground station has a unique fixed broadcast frequency (or frequencies) used to broadcast various information (e.g., housekeeping information, status information, protocol results, data packets, and/or the like) in a repeating continuous stream of data, and a plurality of N different downlink frequencies (where N is a natural number greater than 1) that are used to receive downlink packets from aircraft. The plurality of N downlink frequencies are different from the unique fixed broadcast frequency (or frequencies). Thus, the ground station can receive downlink packets from a plurality of aircraft concurrently (or simultaneously) via the plurality of downlink frequencies, and can broadcast responses (e.g., acknowledgements) via one or more of the fixed broadcast frequencies without having to wait for a subsequent frame (e.g., 32 seconds or 64 seconds) for each attempt.

Figure 1A:
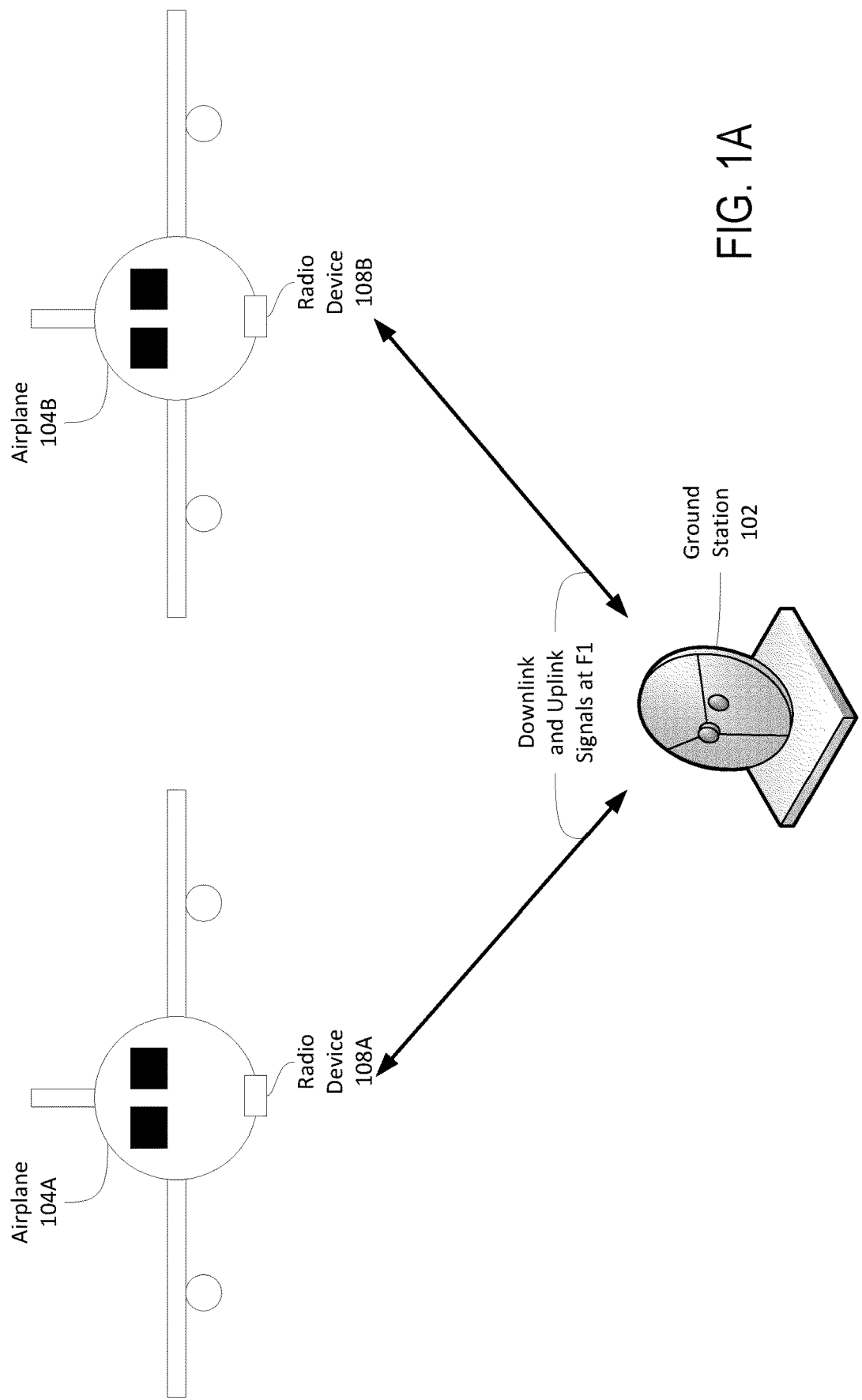
FIG. 1A is a block diagram of a typical HFDL communication system, according to a comparative example.
Figure 1B:
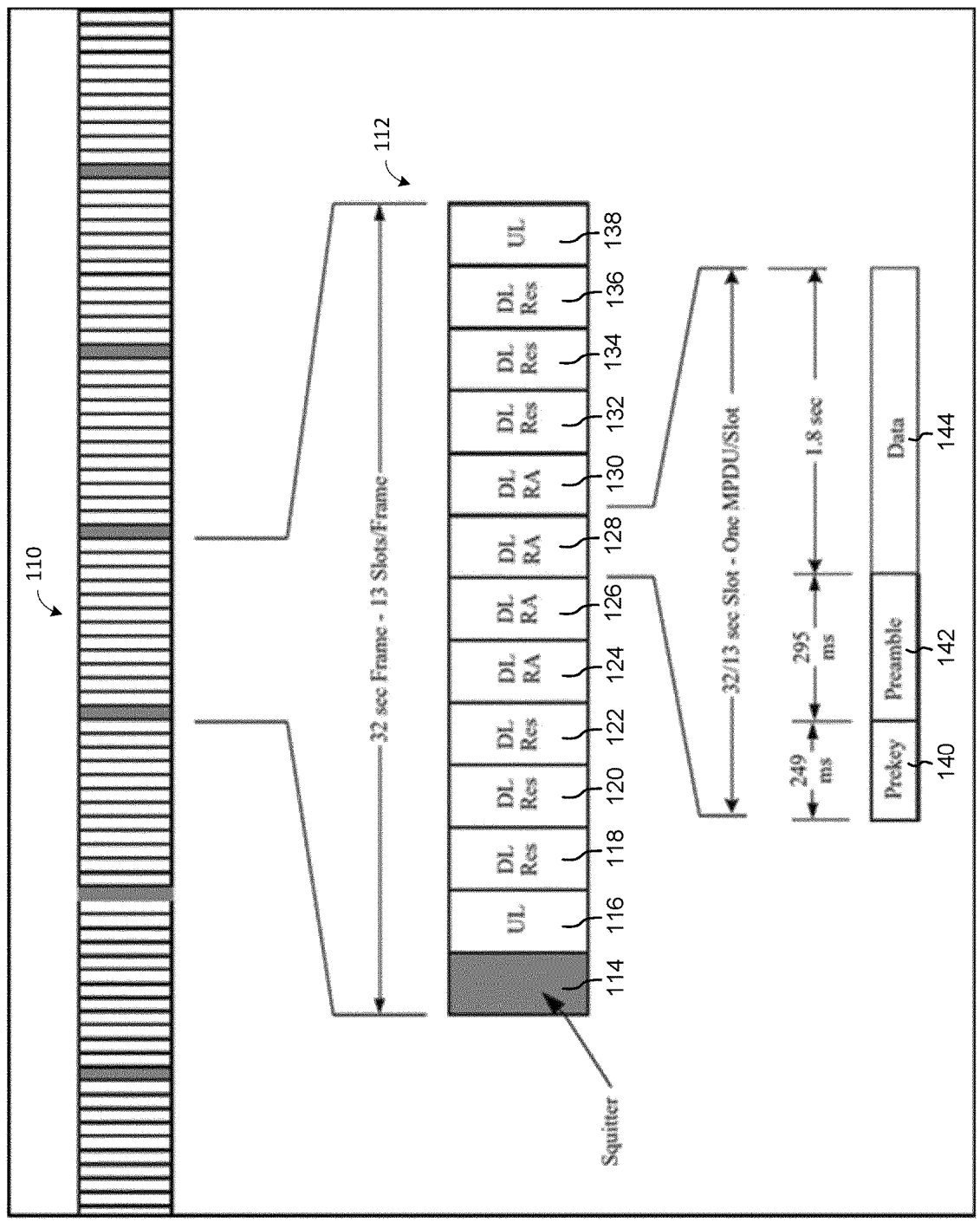
FIG. 1B is a typical TDMA frame structure of the HFDL communication system shown in FIG. 1A, according to the comparative example.

For example, FIG. 1A shows a typical HFDL communication system, and FIG. 1B shows a typical TDMA frame structure of the HFDL communication system shown in FIG. 1A, according to a comparative example. Referring to FIGS. 1A and 1B, a typical HFDL communication system 100 uses a half-duplex (e.g., single shared) frequency F1 to support uplinks (e.g., ground station to aircraft), downlinks (e.g., aircraft to ground station), transmission of success/fail messages (or acknowledgements), transmission of housekeeping data, and/or the like, which can cause delays in delivering data packets between a plurality of aircraft 104A and 104B and a ground station 102. A respective radio device 108A or 108B on the aircraft 104A and 104B may establish a communication session with the ground station 102 by first scanning for a signal on the frequency F1. The signal may be in the form of a pulse message (sometimes referred to as a "squitter") that indicates the start of each frame and may contain various information.

Each frame has a duration (e.g., 32 seconds) corresponding to a frame rate and is divided into a plurality of slots. For example, as shown in FIG. 1B, one 32 second frame 110 includes 13 slots 112. The 13 slots 112 includes one squitter slot 114 and twelve medium access protocol data unit (MPDU) slots. The squitter slot carries various types of information, including slot acknowledgement, assignment codes, and/or the like. The MPDU slots include two uplink slots (UL) 116 and 138, six downlink reserved slots (DL Res) 118, 120, 122, 132, 134, and 136, and four downlink random access slots (DL RA) 124, 126, 128, and 130. Generally, each of the slots (squitter and MPDU) has a same or similar structure, which includes a 249 ms Prekey 140 (e.g., a 1440 Hz single tone) used to detect each slot, a 295 ms Preamble 142 (e.g., known BPSK symbols) used for synchronization purposes, and 1.8 sec Data 144 (e.g., uplink or downlink data).

The MPDU slots are used by the aircraft 104A and 104B and the ground station 102 to exchange various kinds of data (e.g., aircraft login/logoff requests, aircraft position information, frequency assignments, and/or the like). For example, the downlink slots (e.g., DL RA) are used by aircraft (e.g., 104A and 104B) to transmit downlink packets to the ground station 102, and the uplink slots (e.g., UL) are used by the ground station 102 to transmit uplink packets to the aircraft 104A and 104B. As discussed earlier, a problem with the typical HFDL communication system is that there may be delays caused by transmission fails and retries by virtue of having only a single shared frequency (e.g., F1) with a limited number of uplink and downlink slots available for each frame.

Figure 2:
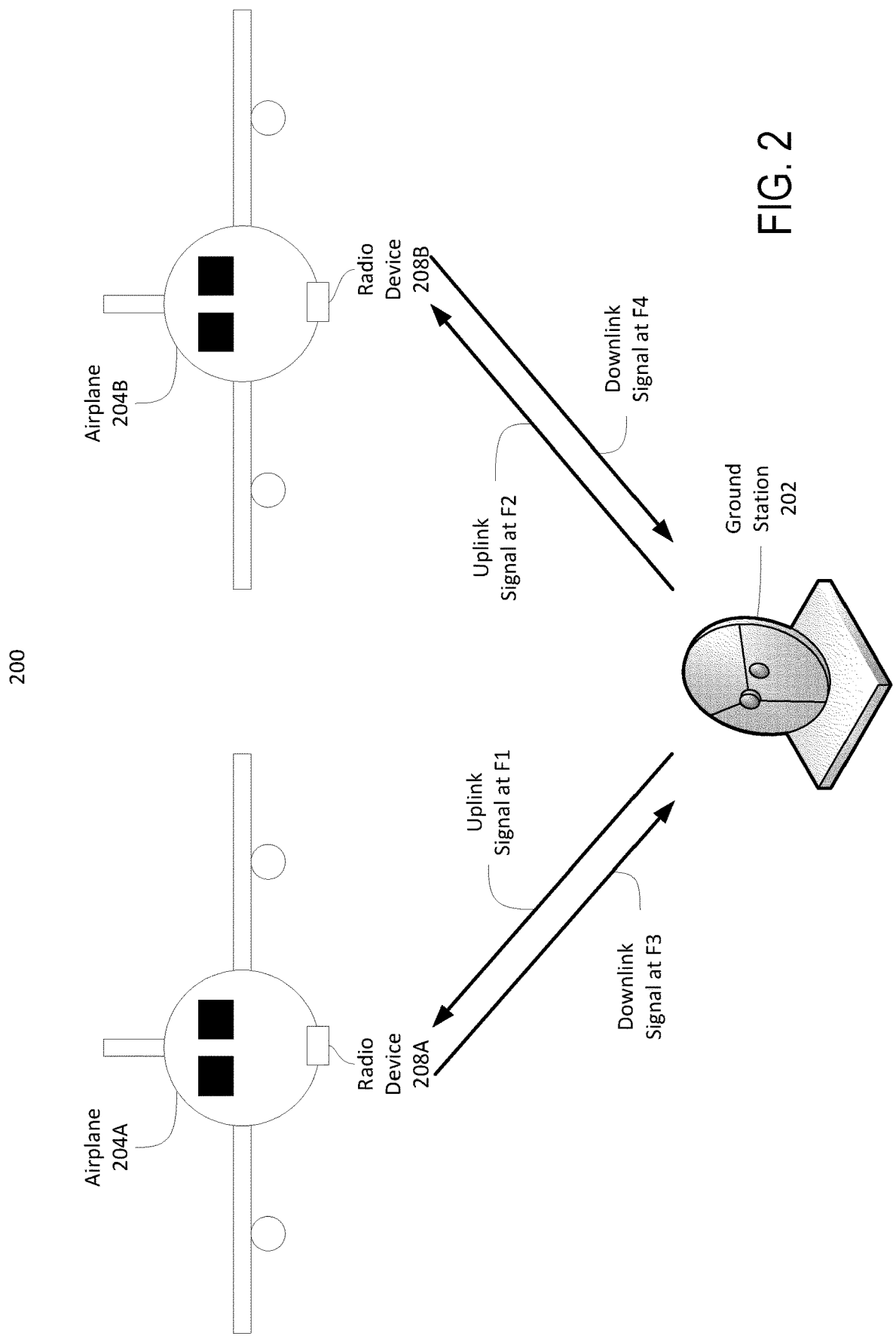
FIG. 2 is a block diagram of a HFDL communication system, according to various exemplary embodiments.

Referring now to FIG. 2, a HFDL communication system is shown, according to various exemplary embodiments. In various embodiments, the HFDL communication system 200 uses a plurality of frequencies (e.g., F1, F2, F3, and F4) to support uplinks (e.g., ground station to aircraft), downlinks (e.g., aircraft to ground station), transmission of success/fail messages (or acknowledgements), transmission of housekeeping data, and/or the like, which can provide low latency for successful air to ground transmissions. For example, in some embodiments, the ground station 202 can broadcast (e.g., responses, acknowledgements, uplink data, and/or the like) over one or more fixed broadcast frequencies (e.g., F1 and F2, which may be the same frequency or different from each other), and the plurality of aircraft 204A and 204B can transmit over a plurality of frequencies (e.g., F3 and F4) that are different from the fixed broadcast frequency (or frequencies). Thus, when compared to the typical HFDL communication system 100 (e.g., as shown in FIG. 1A), the time for successful communication transactions can be reduced to seconds instead of taking minutes (or longer), which can allow for timely delivery of messaging (e.g., Future Air Navigation Systems (FANS) messages, Required Communication Performance RCP240 messages, and/or the like) desired for more efficient management of aircraft inflight operations, for example.

In more detail, a plurality of ground stations (e.g., 202) may be located around the world (currently 15), and each ground station (e.g., 202) may have a unique fixed broadcast frequency (or frequencies) that is dedicated for broadcasting the ground station's housekeeping information, status information, protocol results, data uplink packets, and/or the like in a repeating continuous stream of data. In some embodiments, the housekeeping information is interleaved with the data uplink packets such that the housekeeping information rate is less than or equal to once per second. In some embodiments, the house keeping information includes identification information of the ground station, a pool or list of downlink frequencies that the aircraft can use to transmit on, frequency loading information that can be used by the aircraft to choose a less loaded frequency, and/or the like. In some embodiments, the pool or list of downlink frequencies can change dynamically in response to various conditions, for example, such as sunspots, propagation characteristics, and/or the like. Thus, in some embodiments, each ground station (e.g., the ground station 202) can periodically or continuously transmit the housekeeping information including the pool or list of downlink frequencies via the unique fixed frequency (or frequencies) to inform the aircraft (e.g., 204A and 204B) which frequencies to transmit on. In various embodiments, each of the aircraft 204A and 204B may be any suitable aircraft (e.g., a helicopter, propeller airplane, passenger airliner, fighter plane, dirigible balloon, etc.) with an on-board radio device (e.g., 208A or 208B) for communicating with other aircraft and/or ground stations (e.g., 202).

In some embodiments, since each of the ground stations (e.g., 202) has a unique fixed broadcast frequency (or frequencies), each respective radio device 208A and 208B of the aircraft 204A and 204B can include a list or table of all ground station broadcast frequencies. Thus, the radio devices 208A and 208B can be tuned to the particular broadcast frequency (or frequencies) corresponding to each ground station 202 within range to receive and identify the available downlink frequencies that the ground station 202 is listening on (e.g., as part of the housekeeping information). After the radio devices 208A and 208B identifies the list of downlink frequencies received via the fixed broadcast frequency (or frequencies) for the particular ground station (e.g., 202), the radio devices 208A and 208B can be tuned to monitor (or listen on) each of the available downlink frequencies, choose an available downlink frequency (e.g., having an open slot), and transmit the downlink packets. Thus, transmission collisions can be avoided or reduced by transmitting downlink packets on an available one of the downlink frequencies. The ground station 202 can then respond (or acknowledge) the successful (or failed) receipt of the downlink packets on the unique fixed broadcast frequency (or frequencies). Thus, the response can occur in a matter of a few seconds, for example, rather than 32 seconds or 64 seconds (or longer) for each attempt, as is the case for the typical HFDL communication system 100 described above with reference to FIGS. 1A and 1B.

While in some embodiments, each aircraft attempting to communicate with the ground station 202 can do so over a different downlink frequency, in practice there may be many more aircraft attempting to communicate with the ground station 202 than there are available downlink frequencies at any given time. In this case, a frame structure similar to the TDMA frame structure shown in FIG. 1B may be used. However, since the ground station 202 broadcasts over a different fixed broadcast frequency (or frequencies) than those of the downlink frequencies, in some embodiments, the frames of the downlink frequencies can exclude the uplink slots (UL) and/or the squitter slot, and the frames of the uplink frequency (or frequencies) can exclude the downlink slots (e.g., DL Res, DL RA, and/or the like). However, the present disclosure is not limited thereto, and the frame structure may be variously modified depending on the application or requirements. For example, depending on the application or requirements, the same TDMA frame structure shown in FIG. 1B may be used, or a different frame structure may be used, all without departing from the spirit and scope of the present disclosure.

Figure 3:
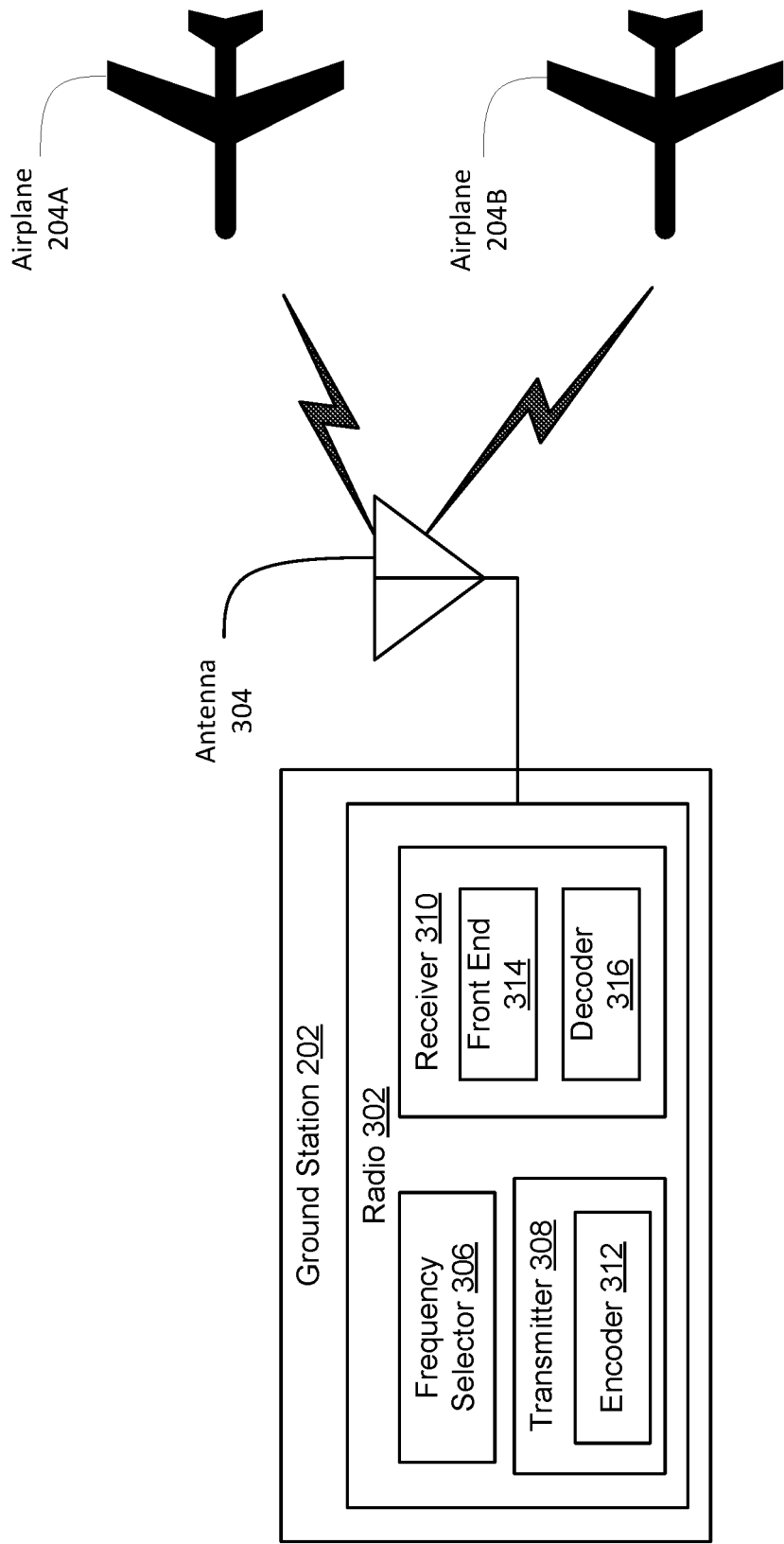
FIG. 3 is a block diagram of a ground station in more detail, according to some exemplary embodiments.

Referring now to FIG. 3, a block diagram of a ground station is shown in more detail, according to some exemplary embodiments. In some embodiments, the ground station 202 may include a radio (e.g., a digital radio) 302 and one or more antennas 304 connected to the radio 302. The one or more antennas 304 may be used to communicate with the radio devices (e.g., 208A and 208B) of the aircraft 204A and 204B. For example, the one or more antennas 304 may receive signals (e.g., downlink data packets) from the radio device 208A and 208B, and may transmit signals (e.g., uplink data packets) to the radio devices 208A and 209B. In various embodiments, the one or more antennas 304 may include or correspond to a half-wave dipole, a dipole antenna (e.g., corner reflector or log-periodic), a monopole antenna (e.g., whip, mast, umbrella, or inverted F), a travelling wave antenna (e.g., helical or spiral), a reflector antenna (e.g., corner or parabolic), an aperture antenna (e.g., parabolic, slot, horn, or dielectric), a microstrip antenna, an array antenna, a loop antenna, or any other suitable kinds of antennas.

In some embodiments, the radio 302 includes one or more processors and memory. The processors may be configured to execute computer code and/or program instructions stored in the memory or received from other computer readable media (e.g., CDROM, network storage, a remote server, etc.). The processors can be implemented on one or more processing circuits using various electronic components. For example, in some embodiments, the processors may include a microprocessor unit, an application-specific integrated circuit (ASIC), and/or a field-programmable gate array (FPGA), among others. The processors may also be a multi-core processor or an array of processors. The memory may include electronic, optical, magnetic, or any other storage device capable of relaying or providing the processor with program instructions. The memory may include, for example, a floppy disk, CD-ROM, DVD, magnetic disk, memory chip, Static random access memory (SRAM), Burst SRAM or SynchBurst SRAM (BSRAM), Dynamic random access memory (DRAM), Ferroelectric RAM (FRAM), NAND Flash, NOR Flash, and Solid State Drives (SSD), among others, or any combination thereof. The program instructions may include code from any programming language, such as C, C++, C#, Java, JavaScript, Perl, HTML, XML, Python, Visual Basic, et cetera, or any combination thereof.

In some embodiments, the radio 302 may include a frequency selector 306, a transmitter 308, and a receiver 310, among other components. In some embodiments, the frequency selector 306 is configured to determine a plurality of downlink frequencies that the aircraft 204A and 204B can use to transmit on. For example, in some embodiments, the plurality of downlink frequencies may be dynamically changed in response to various conditions, for example, such as sunspots, propagation characteristics (e.g., day and night propagation changes), and/or the like. In this case, the frequency selector 306 is configured to determine the changes in the plurality of downlink frequencies that are made available for the aircraft 204A and 204B to transmit on. In some embodiments, the frequency selector 306 tunes the transmitter 308 to transmit signals (e.g., housekeeping information data, uplink data, and/or the like) on a first frequency (or frequencies), and tunes the receiver 310 to monitor (or listen for) signals (e.g., downlink packets, and/or the like) on a plurality of N second frequencies (where N is a natural number greater than 1) that are different from the first frequency (or frequencies).

In some embodiments, the transmitter 308 transmits housekeeping information and/or uplink data packets to the aircraft 204A and 204B on the first frequency (or frequencies). In some embodiments, the transmitter 308 includes an encoder 312, among other components, to encode the data for transmission to the aircraft 204A and 204B. For example, in some embodiments, the encoder 312 interleaves the housekeeping information with the uplink data packets for transmission over the first frequency (or frequencies). However, the present disclosure is not limited thereto, and in other embodiments, the transmitter 308 may transmit the housekeeping information on a dedicated frequency that is different from the first frequency (or frequencies).

In various embodiments, since the housekeeping information includes the pool or list of available downlink frequencies for the aircraft 204A and 204B to transmit on, the transmitter 308 continuously or periodically broadcasts the housekeeping information at predetermined intervals over the first frequency (or frequencies) or over the dedicated frequency. In some embodiments, the transmitter 308 transmits a response (or acknowledgement) over the first frequency (or frequencies) when data is successfully (or unsuccessfully) received from a corresponding one of the aircraft 204A and 204B over a corresponding one of the plurality of N second frequencies. In some embodiments, the duration of the intervals may be variously changed depending on the conditions. For example, if many aircraft downlink many packets, the ground station may have to acknowledge all of those packets and may delay (not discard) the broadcasting of housekeeping information. In this case, high priority messages may be treated in the response time needed to support FANS, for example. The transmitter 308 can then resume its normal broadcasts of the housekeeping information once the high priority messages have been treated.

In some embodiments, the receiver 310 is configured to monitor each of the plurality of N second frequencies for communication transactions from the aircraft 204A and 204B. For example, in some embodiments, the receiver 310 includes a front end (e.g., a wideband front end) 314 to monitor (or listen on) each of the plurality of N second frequencies. In some embodiments, the receiver 310 is a single receiver configured to listen on each of the plurality of N second frequencies concurrently (e.g., simultaneously). In other embodiments, the receiver 310 may include a plurality of receivers, each configured to listen on a corresponding one of the plurality of N second frequencies. In some embodiments, the receiver 310 is configured to signal process the received signals on each of the plurality of N second frequencies, and includes a decoder 316 to decode the data of the signals received on each of the plurality of N second frequencies.

Figure 4:
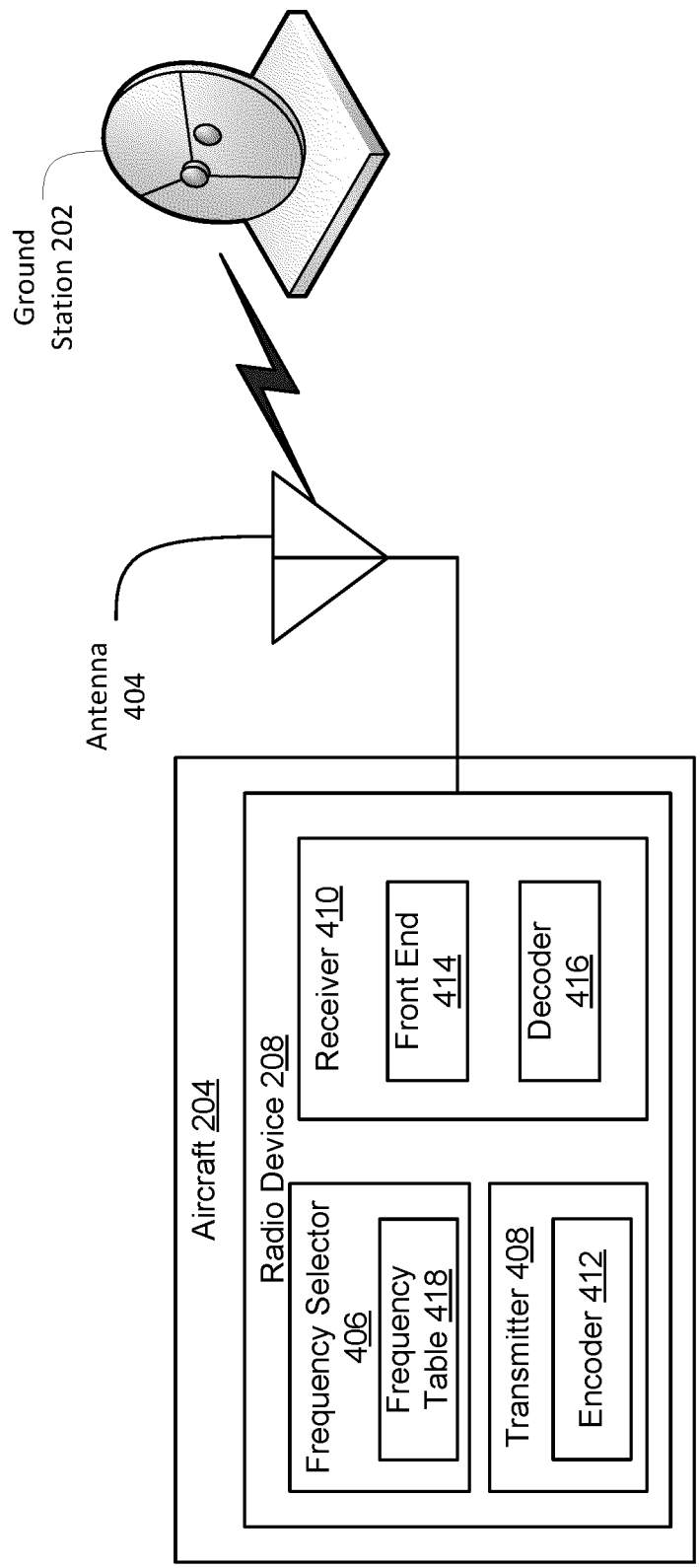
FIG. 4 is a block diagram of an aircraft in more detail, according to some exemplary embodiments.

Referring now to FIG. 4, a block diagram of an aircraft is shown in more detail, according to some exemplary embodiments. In some embodiments, the aircraft 204 may include a radio device (e.g., a digital radio) 208 and one or more antennas 404 connected to the radio device 208. In some embodiments, each of the radio devices 208A and 208B in FIG. 2 may have the same or similar configuration as the radio device 208 in FIG. 4. The one or more antennas 404 may be used to communicate with the ground station 202. For example, the one or more antennas 404 may receive signals (e.g., housekeeping information data, responses or acknowledgements, uplink data packets, and the like) from the ground station 202, and may transmit signals (e.g., connection requests, downlink data packets, and the like) to the ground station 202. In various embodiments, the one or more antennas 304 may include or correspond to a half-wave dipole, a dipole antenna (e.g., corner reflector or log-periodic), a monopole antenna (e.g., whip, mast, umbrella, or inverted F), a travelling wave antenna (e.g., helical or spiral), a reflector antenna (e.g., corner or parabolic), an aperture antenna (e.g., parabolic, slot, horn, or dielectric), a microstrip antenna, an array antenna, a loop antenna, or any other suitable kinds of antennas.

In some embodiments, the radio device 208 includes one or more processors and memory. The processors may be configured to execute computer code and/or program instructions stored in the memory or received from other computer readable media (e.g., CDROM, network storage, a remote server, etc.). The processors can be implemented on one or more processing circuits using various electronic components. For example, in some embodiments, the processors may include a microprocessor unit, an application-specific integrated circuit (ASIC), and/or a field-programmable gate array (FPGA), among others. The processors may also be a multi-core processor or an array of processors. The memory may include electronic, optical, magnetic, or any other storage device capable of relaying or providing the processor with program instructions. The memory may include, for example, a floppy disk, CD-ROM, DVD, magnetic disk, memory chip, Static random access memory (SRAM), Burst SRAM or SynchBurst SRAM (BSRAM), Dynamic random access memory (DRAM), Ferroelectric RAM (FRAM), NAND Flash, NOR Flash, and Solid State Drives (SSD), among others, or any combination thereof. The program instructions may include code from any programming language, such as C, C++, C#, Java, JavaScript, Perl, HTML, XML, Python, Visual Basic, et cetera, or any combination thereof.

In some embodiments, the radio device 208 may include a frequency selector 406, a transmitter 408, and a receiver 410, among other components. In some embodiments, the frequency selector 406 is configured to determine broadcast frequencies that each ground station (e.g., 202) uses to broadcast housekeeping information data on. For example, in some embodiments, the frequency selector includes a frequency table 418 that lists the broadcast frequencies for each of the ground stations (e.g., 202). In this case, the frequency selector 406 tunes the receiver 410 to listen on a corresponding broadcast frequency of the ground station 202 in range of the aircraft 204 to receive the housekeeping information data.

In various embodiments, the housekeeping information data includes, among other things, a list of a plurality of N downlink frequencies (where N is a natural number greater than 1) that the ground station 202 is listening on (or monitoring). The frequency selector 406 is configured to tune the receiver 410 to monitor each of the downlink frequencies provided in the housekeeping information data to choose an available downlink frequency having an open slot. After choosing the available downlink frequency having the open slot, the frequency selector 406 is configured to tune the transmitter 408 to transmit data (e.g., connection requests, downlink data, and/or the like) on the open slot of the chosen downlink frequency. Thus, in some embodiments, a plurality of aircraft (e.g., 204A and 204B) may communicate with the ground station 202 concurrently by using different ones of the N downlink frequencies.

For example, in some embodiments, the frequency selector 406 tunes the receiver 410 to monitor for signals (e.g., responses or acknowledgements, uplink data, and/or the like) on a first frequency (or frequencies) used by the ground station 202 to broadcast signals, and tunes the transmitter 408 to transmit signals (e.g., downlink packets, and/or the like) on an available one of a plurality of N second frequencies (where N is a natural number greater than 1) that are different from the first frequency (or frequencies). Thus, in some embodiments, the transmitter 408 includes an encoder 412, among other components, to encode the data for transmission to the ground station 202, and the transmitter 408 transmits the encoded data to the ground station 202 via the available one of the plurality of N second frequencies.

In some embodiments, the receiver 410 is configured to monitor the broadcast frequency (or frequencies) and each of the plurality of N second frequencies for communication transactions from the ground station 202 and from other aircraft. For example, in some embodiments, the receiver 410 includes a front end (e.g., a wideband front end) 414 to listen on each of the frequencies (e.g., the first and second frequencies). In some embodiments, the receiver 410 is configured to signal process the signals received on each of the first and second frequencies, and includes a decoder 416 to decode the data received on each of the first and second frequencies.

In some embodiments, the receiver 410 is a single receiver configured to listen on each of the first and second frequencies concurrently (e.g., simultaneously). In other embodiments, the receiver 410 may include a plurality of receivers, each configured to listen on a corresponding one of the first and second frequencies. In this case, each of the receivers 410 on the aircraft 202 may not be restricted to a single frequency, but may change frequencies dynamically (e.g., several times each minute or more), but each receiver may be configured to only receive a single frequency at a time. For example, each of the receivers 410 can tune to different frequencies to scan for other ground stations. In this case, the receiver 410 can dynamically change frequencies when the receiver is not otherwise in use. For example, if the housekeeping information indicates no uplink packets for a corresponding aircraft for a certain period, the receiver 410 can tune to other frequencies to listen for other ground stations. In this case, acknowledgements may be transmitted from multiple ground stations, and can be received from the multiple ground stations concurrently, if necessary or desired. For example, digital voice and data uplinks may be received from the multiple ground stations concurrently. In some embodiments, there may be a single receiver from among the plurality of receivers 410 on aircraft 204 that is dedicated to listening for other ground stations only. This can reduce the time to change ground stations when the aircraft is out of range, when propagation characteristics are no longer suitable, or other reasons.

Figure 5:
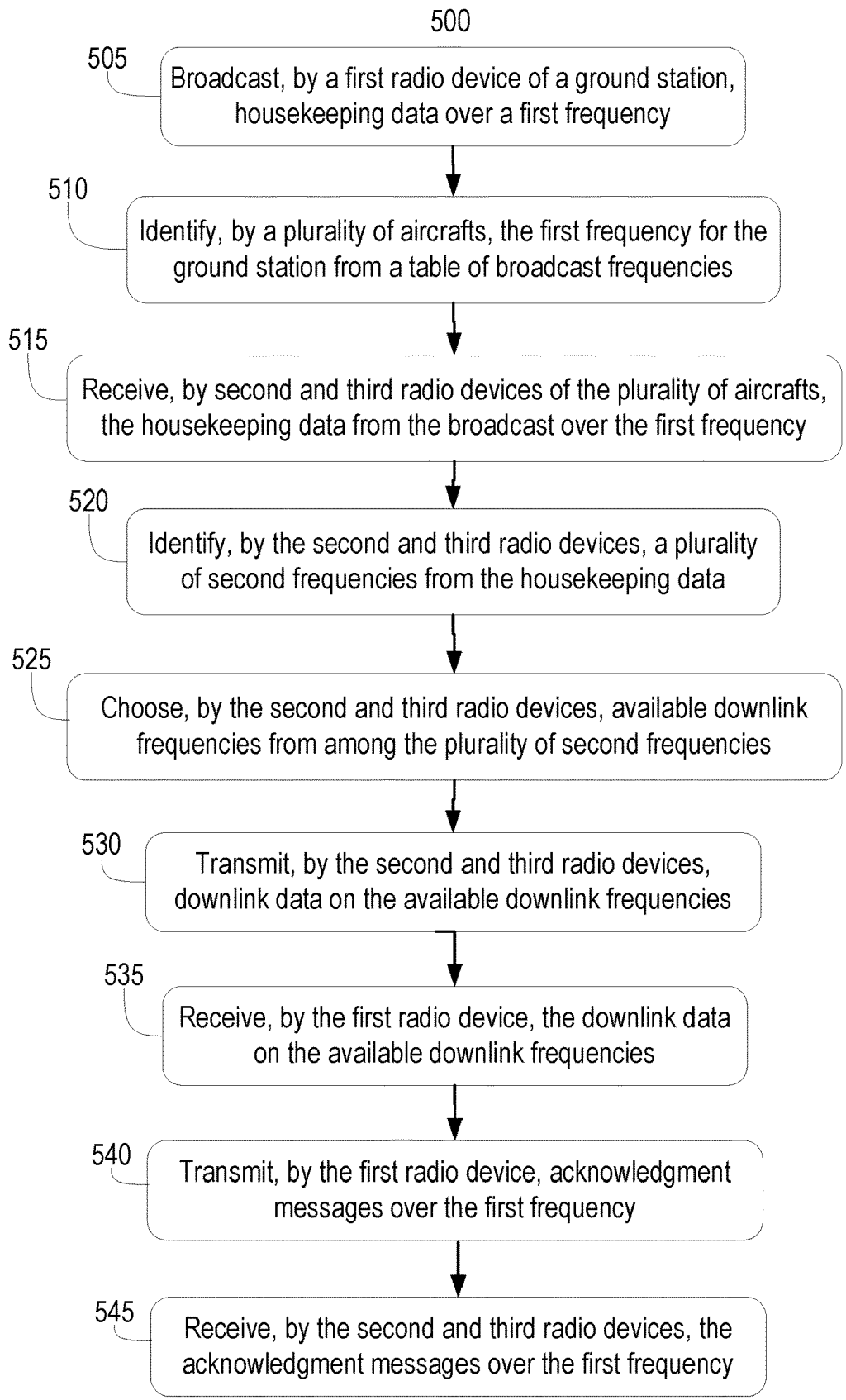
FIG. 5 is a flow diagram of a process or method for air to ground communications, according to some exemplary embodiments.

FIG. 5 is a flow diagram of a process for air to ground communications, according to some exemplary embodiments. Referring to FIG. 5, a first radio device of a ground station broadcasts housekeeping data over a first frequency at block 505, which may be a dedicated broadcast frequency (or frequencies). The housekeeping data may include a pool or list of a plurality of N second frequencies (where N is a natural number greater than 1), which aircraft can use to transmit downlink data to the ground station. In some embodiments, the aircraft can identify the first frequency for the ground station from a table of broadcast frequencies for every ground station across the world at block 510.

In some embodiments, the plurality of aircraft receives the housekeeping data from the broadcast over the first frequency at block 510. For example, in some embodiments, a second radio device of a first aircraft from among the plurality of aircraft and a third radio device of a second aircraft from among the plurality of aircraft each receives the housekeeping data from the broadcast over the first frequency. In some embodiments, each of the second and third radio devices identifies a plurality of N second frequencies (where N is a natural number greater than 1) from the housekeeping data at block 520. In some embodiments, the plurality of N second frequencies are frequencies that the ground station currently monitors (or listens on) for downlink data. In some embodiments, the plurality of N second frequencies may be dynamically changed, and thus, the ground station continuously or periodically broadcasts the most updated list on the first frequency.

In some embodiments, the second radio device of the first aircraft and the third radio device of the second aircraft chooses available downlink frequencies from among the plurality of N second frequencies at block 525. For example, in some embodiments, the second radio device of the first aircraft chooses a first available downlink frequency from among the plurality of N second frequencies, and the third radio device of the second aircraft chooses a second available downlink frequency from among the plurality of N second frequencies. In some embodiments, the first available downlink frequency may be different from the second available downlink frequency. In some embodiments, the second and third radio devices may determine one of the plurality of N second frequencies are available if no other aircraft is currently transmitting on the frequency or the frequency has an available slot.

In some embodiments, each of the second and third radio devices transmit downlink data on the available downlink frequencies at block 530. For example, in some embodiments, the second radio of the first aircraft transmits downlink data on the first available downlink frequency, and the third radio device of the second aircraft transmits downlink data on the second available downlink frequency. In some embodiments, the first radio device of the ground station receives the downlink data on the available downlink frequencies at block 535. For example, in some embodiments, the second radio device and the third radio device concurrently (or simultaneously) transmits the downlink data on the first available downlink frequency and the second available downlink frequency, respectively. In this case, the first radio device of the ground station is configured to monitor (or listen on) each of the plurality of N second frequencies concurrently (or simultaneously), and thus, receives the downlink data from each of the second and third radio devices on the first and second available downlink frequencies concurrently (or simultaneously).

In some embodiments, the first radio device of the ground station transmits acknowledgement messages over the first frequency at block 540. For example, in some embodiments, the first radio device transmits an acknowledgment message to the second radio device of the first aircraft over the first frequency that the downlink data was successfully received, and transmits an acknowledgment message to the third radio device of the second aircraft over the first frequency that the downlink data was successfully received. Each of the second and third radio devices of the first and second aircraft receives the acknowledgement messages over the first frequency at block 545.

Accordingly, in various embodiments, each ground station (e.g., ground station 202) has a unique fixed broadcast frequency (or frequencies) that is used to continuously or periodically transmit a list of downlink frequencies that the ground stations are monitoring (or listening on), and each aircraft (e.g., aircraft 204A and 204B) receives the list of downlink frequencies over the unique fixed broadcast frequency (or frequencies) for a corresponding ground station in range. Each of the aircraft can then transmit data on any available one of the downlink frequencies for the corresponding ground station in range, and the corresponding ground station may send responses or acknowledgements (e.g., successful/failed) or other data (e.g., uplink data) to the aircraft using the unique fixed broadcast frequency (or frequencies) for the corresponding ground station. Thus, latency for successful communication transactions between the aircraft and the ground station can be reduced.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A ground station radio device comprising:
   a transmitter configured to transmit uplink data to a plurality of aircraft over a first frequency; and
   a receiver configured to receive downlink packets from the plurality of aircraft over a plurality of second frequencies that are different from the first frequency, wherein the transmitter transmits an acknowledge, first information and first uplink packets over the first frequency, wherein the first information comprises list of available downlink frequencies for the second frequencies over the first frequency, wherein the acknowledge is provided when a downlink packet successfully received from one of the aircraft.

2. The device of claim 1, wherein the transmitter is configured to repeatedly broadcast the first information over the first frequency and the first information is delayed to send the acknowledge for many packets received from the aircraft.

3. The device of claim 1, wherein the receiver is configured to receive downlink data from a first aircraft from among the plurality of aircraft over one of the second frequencies, and to receive downlink data from a second aircraft from among the plurality of aircraft over a different one of the second frequencies.

4. The device of claim 3, wherein the receiver is configured to receive the downlink data from the first and second aircraft over different of the second frequencies concurrently.

5. The device of claim 1, wherein the transmitter is configured to transmit acknowledgment messages to the plurality of aircraft over the first frequency in response to receiving the downlink data over the plurality of second frequencies.

6. The device of claim 1, wherein the receiver is configured to monitor each of the plurality of second frequencies concurrently.

7. An aircraft radio device comprising:
   a receiver configured to receive uplink data from a ground station over a first frequency; and
   a transmitter configured to transmit downlink data to the ground station over one of a plurality of second frequencies that are different from the first frequency,
   wherein the receiver is configured to receive housekeeping data from the ground station over the first frequency to identify the plurality of second frequencies,
   wherein the receiver is configured to monitor each of the plurality of second frequencies concurrently to identify an available frequency from among the plurality of second frequencies on which to transmit the downlink data, wherein the available frequency is identified as one in which another aircraft is not currently transmitting downlink data on.

8. The device of claim 7, wherein the receiver is configured to receive an acknowledgment message from the ground station over the first frequency in response to successfully transmitting the downlink data over the one of the plurality of second frequencies.

9. An aircraft radio device comprising:
   a receiver configured to receive uplink data from a ground station over a first frequency; and
   a transmitter configured to transmit downlink data to the ground station over one of a plurality of second frequencies that are different from the first frequency, wherein the radio device further comprises an electronic processor configured to identify the first frequency from a frequency table including a list of broadcast frequencies of all ground stations.

10. The device of claim 9, wherein the receiver is configured to receive housekeeping data from the ground station over the first frequency to identify the plurality of second frequencies.

11. The device of claim 10, wherein the receiver is configured to monitor each of the plurality of second frequencies concurrently to identify an available frequency from among the plurality of second frequencies on which to transmit the downlink data.

12. The device of claim 11, wherein the available frequency is identified as one in which another aircraft is not currently transmitting downlink data on.

13. An air to ground communication method, comprising:
transmitting, by a first radio device of a ground station, housekeeping data to a plurality of aircraft over a first frequency, wherein the housekeeping data comprises list of available downlink frequencies for the second frequencies over the first frequency;
receiving, by the first radio device, downlink data from each of the plurality of aircraft over a plurality of second frequencies that are different from the first frequency;
providing an acknowledge on the first frequency, wherein the acknowledge is provided when the downlink data is successfully received from the aircraft, wherein transmitting the housekeeping data is delayed so that the download data can be acknowledged when many aircraft provide the downlink data.

14. The method of claim 13, wherein the downlink data is received from each of the plurality of aircraft over different ones of the second frequencies.

15. The method of claim 13, wherein the housekeeping data includes information corresponding to a list of the plurality of second frequencies that the ground station is monitoring.

16. The method of claim 15, further comprising:
choosing, by a second radio device of a first aircraft from among the plurality of aircraft, a first available frequency from among the second frequencies; and
transmitting, by the second radio device, downlink data to the ground station over the first available frequency.

17. The method of claim 16, further comprising:
choosing, by a third radio device of a second aircraft from among the plurality of aircraft, a second available frequency from among the second frequencies; and
transmitting, by the third radio device, the downlink data to the ground station over the second available frequency,
wherein the second available frequency is different from the first available frequency.

18. The method of claim 17, wherein the downlink data is received concurrently from each of the first and second aircraft over respective ones of the first and second available frequencies.

19. The method of claim 13, wherein the first radio device is configured to broadcast an acknowledgment message over the first frequency in response to successfully receiving the downlink data over the plurality of second frequencies.

20. The method of claim 13, wherein the housekeeping data is interleaved with uplink data packets.

* * * * *